United States Patent [19]
Nafz

[11] Patent Number: 6,000,430
[45] Date of Patent: Dec. 14, 1999

[54] DISTRIBUTION VALVE

[76] Inventor: Siegmund Nafz, Gaupåsveien 148, N-5265 Ytre Arna, Norway

[21] Appl. No.: 09/000,213
[22] PCT Filed: Jul. 26, 1996
[86] PCT No.: PCT/NO96/00193
  § 371 Date: Feb. 17, 1998
  § 102(e) Date: Feb. 17, 1998
[87] PCT Pub. No.: WO97/05413
  PCT Pub. Date: Feb. 13, 1997

[30]    Foreign Application Priority Data

Jul. 28, 1995 [NO]  Norway ..................................... 952991

[51] Int. Cl.$^6$ .................................................. F16K 11/087
[52] U.S. Cl. ............................... 137/625.11; 137/625.19; 137/597
[58] Field of Search ........................ 137/625.11, 625.12, 137/625.13, 625.15, 625.16, 625.19, 597

[56]          References Cited

U.S. PATENT DOCUMENTS

| 2,821,998 | 2/1958 | Mayhew .............................. 137/625.11 |
| 2,996,083 | 8/1961 | Huska ................................. 137/625.11 |
| 3,047,020 | 7/1962 | Barrett, Jr. . |
| 3,166,098 | 1/1965 | Jennings . |
| 3,927,693 | 12/1975 | Johnston . |

FOREIGN PATENT DOCUMENTS

| 23812 | 7/1949 | Finland . |
| 3319273 | 12/1983 | Germany . |
| 159039 | 8/1988 | Norway . |
| 163546 | 3/1990 | Norway . |
| 405888 | 1/1979 | Sweden . |
| 502486 | 10/1995 | Sweden . |

OTHER PUBLICATIONS

Oil States Industries, Rotary Selector & Valve Actuator.

*Primary Examiner*—Kevin Lee
*Attorney, Agent, or Firm*—McAulay Nissen Goldberg Kiel & Hand, LLP

[57]          ABSTRACT

The distribution valve has a housing of hemispherical shape with a plurality of inlets for receiving inflows of fluid as well as a blind position equally spaced with the inlets. The housing also has a main outlet for conducting an outflow mixture of fluids and an oppositely disposed second outlet opening. A rotatable distributing element within the housing has a fluid mixing chamber in communication with the openings as well as a duct having an inlet for selective communication with a respective one of the inlet openings in the housing and an outlet in communication with the second outlet opening in the housing. A common angle of preferably 60° is formed between each inlet opening and the second outlet opening to allow test samples to be withdrawn from time to time. The inlet openings each define a common angle of from 90° to 135° with the main outlet opening for a mixture of fluids. The two outlet openings from the housing are disposed opposite to the each other, for example, on a common axis of rotation of the distributing element.

20 Claims, 2 Drawing Sheets

DISTRIBUTION VALVE

This invention relates to a distribution valve. More particularly, this invention relates to a distribution valve having a housing with a plurality of inlets and a rotatable distributing element for directing a mixture of inlet flows out of the housing.

A distributing valve of the afore-mentioned type is known to have been manufactured earlier by Oil States Industries in the U.S.A. In the known distributing valve the housing comprises a number of inlets, one for each ingoing current, placed symmetrically at a mutual distance about the axis of rotation of the rotatable distributing element within the housing. In the rotatable distributing element there is designed a branch pipe the opening of which can be aligned one after the other with each inlet into the housing, depending upon which position the valve element is turned to. The branch pipe forms an outlet from the distributing element in the form of a straight pipe piece which extends axially of the axis of rotation of the valve element. The valve element is arranged so that it largely occupies space in the upper part of the housing. The fluids which flow into the housing through the inlets are mixed within the distributing valve, at the lower edge of the distributing element, and flow out of the housing through an outlet which is locating obliquely relative to the axis of rotation of the element.

The straight pipe piece thus extends through the portion of the chamber where the ingoing fluids are mixed for further transportation. The pipe thus empedes of the flow and occupies a large portion of the volume of the mixing chamber. The two outlets lead out of the housing from the mixing chamber in almost the same direction. Pockets are formed in the mixing chamber where in addition there is the danger of deposits from solid matter in the fluid, and turbulences will easily arise during the flow.

Another circumstance with the known solution is that at least one of the currents of fluid from the inlets must be flow-turned almost 360° in order to be able to flow out through the outlet in a mixture with the other currents. However the fluid from the diametrically opposite inlet gets an approximately linear flow path through the mixing chamber and out into the outlet.

The two afore-mentioned constructional details of the known distributing valve of Oil States Industries, results in the distributing valve really having a very undesirable technical flow construction.

As mentioned the straight pipe run stands in the way of the flow of fluid, and also at least one of the currents of fluid must turn about 360°. This means that the distributing valve can become exposed to great wear by the through flow of fluids, and especially if the fluids for example comprise solid particles to an appreciable degree.

The object of the present invention is to produce a new and better construction for a distributing valve of the type mentioned by way of introduction, and which will eliminate in large part the disadvantages mentioned.

Briefly, the invention provides a distribution valve which has a plurality of inlets and two outlets wherein several currents of fluid may be delivered into the valve and mixed with the mixture being drawn off through one outlet and in which a selected one of the inlet flows may be removed through the second outlet.

The valve has special application for the extraction of oil and gas from an installation where oil flows into the distribution valve through separate conduits from a number of wells. However, the valve may also be used in connection with the handling of fluid currents, generally, for example, within the chemical processing industry.

The distribution valve includes a housing having a plurality of inlet openings for the introduction of fluid, a first main outlet opening in communication with the inlets for conducting an outflow mixture of fluids and a second outlet opening opposite the first outlet opening.

The distribution valve also includes a rotatable distributing element rotatably mounted in the housing. This element has a fluid mixing chamber in communication with the inlet openings and a duct having an inlet for selective communication with a respective one of the inlet openings in the housing and an outlet in communication with the second outlet opening in the housing.

The distributing element is rotatable into communication with any one of the inlet openings in the housing in order to obtain a test sample from the source of fluid being delivered to that inlet.

The housing is also provided with a blind position for the duct inlet so that the flows from all of the inlets may be mixed within the mixing chamber of the distributing element for outflow through the main outlet of the housing.

These and other objects and advantages of the invention will become more apparent from the following detailed description taken in conjunction with the following drawings wherein.

The distribution valve according to the invention comprises two main portions, namely a housing 30 and within the housing 30 a rotatable distributing element 60.

Figure 1:
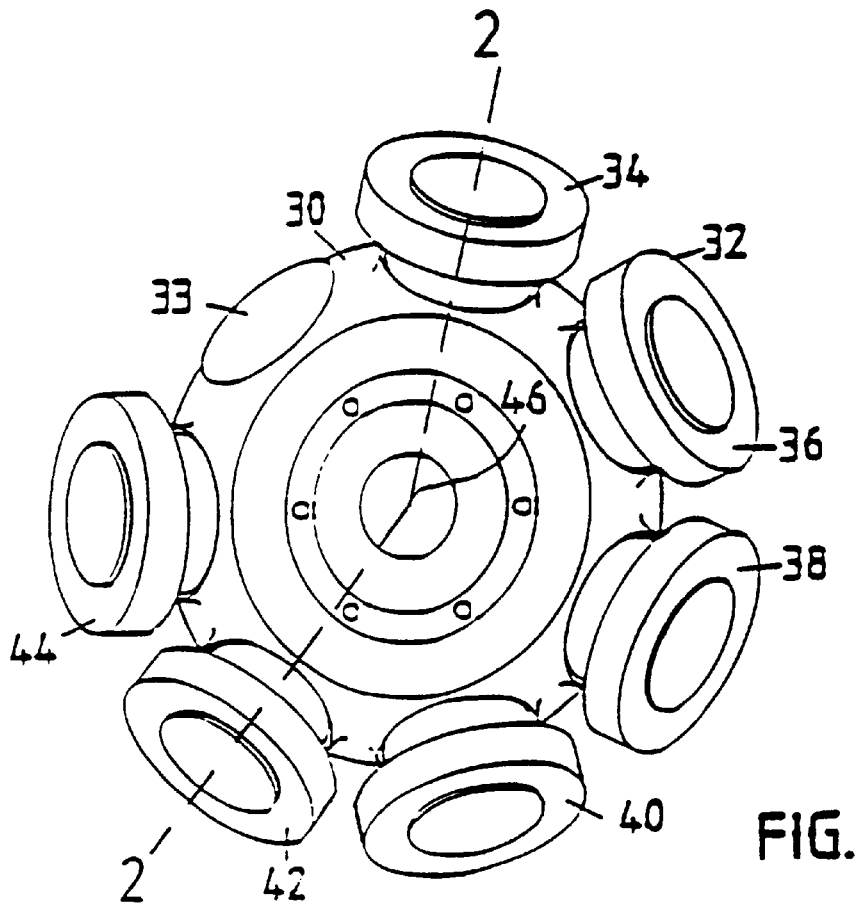
FIG. 1 shows a perspective view seen from above of the housing portion for the distributing valve according to a preferred construction of the invention.

In FIG. 1 the housing 30 for the novel distributing valve according to the invention is shown in a plan view, that is to say seen from above. The housing 30 of the valve has a largely hemispherical construction. According to the construction exemplified the flow of fluid from up to 6 oil/gas wells is handled by the distributing valve according to the invention. In the housing wall of the valve there are arranged therefore 6 inlet openings 34,36,38,40,42,44 with associated pipe screwing flanges 32 for coupling a well conduit to the housing from each well, for the introduction of well fluid to the interior of the valve housing 30. In addition the valve housing comprises a blind parking position 33 which the distributing element 60 is adjusted against when fluid is not to be removed for testing from one of the wells. The parking position 33 involves besides there being no opening through the housing 30 from any well into the duct through the distributing element 60. In the case exemplified, the 6 inlets 34–44 and the blind position 33 form seven (7) positions for the adjustment of the distributing element 60. The seven inlets/blind position 34–44;33 are arranged substantially at a mutually equal spacing along the associated peripheral surface of the housing. The inlet/blind positions are arranged substantially symmetrically along the peripheral surface about a central outlet opening 46 from the housing 30. The central test sample—outlet opening 46 forms a top point of the hemisphere which the housing 30 forms.

Figure 2:
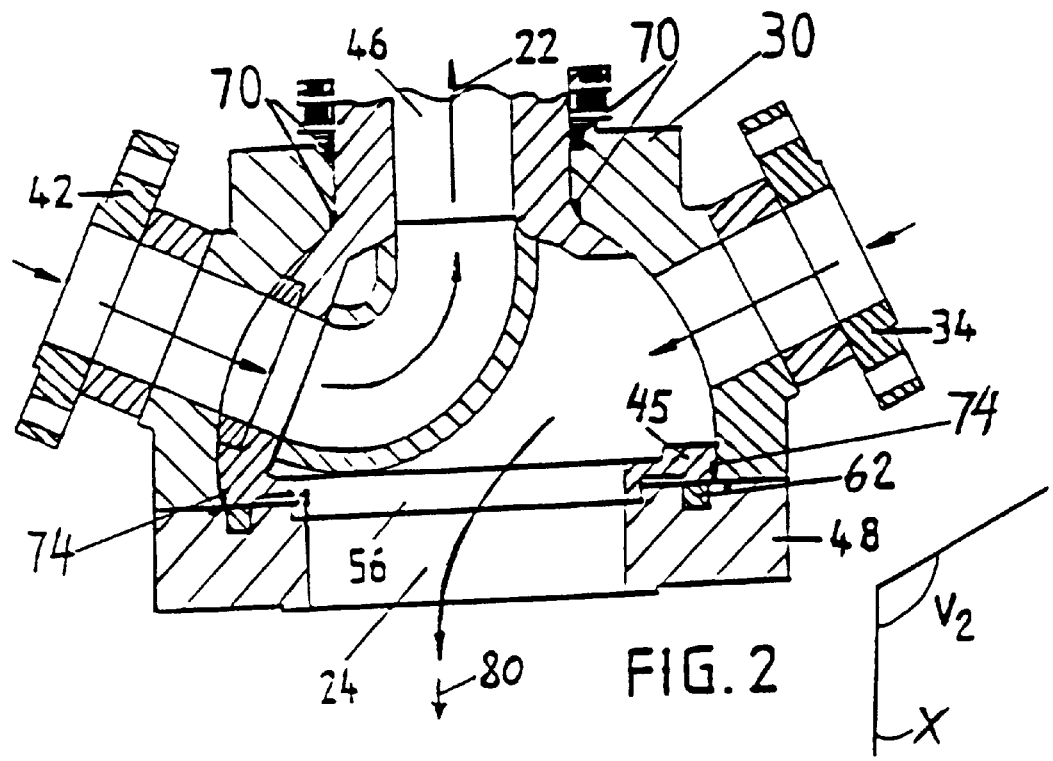
FIG. 2 shows a vertical section along the line 2—2 of FIG. 1, through the housing portion and the distributing element of the distributing valve according to the invention where the distributing element is in an activated position for separately leading away fluid from one of the wells for test purposes.

Referring to FIG. 2 the housing 30 further comprises a bottom portion 48 which forms a seat 62 in which the rotatable distributing element 60 can be turned. The bottom portion 48 has an annular form for forming a central bottom outlet 24 from the valve housing 30. It will be evident that the bottom portion 48 is located in that portion of the hemispherical shape of the housing which substantially forms the largest diametrical surface. It is preferred that an axis (shown by X—X in FIG. 3) goes respectively through the center of the top outlet 46 and the bottom outlet 24 from the housing. Thus the axis cuts the centre of the sphere. As will be evident from what follows, the axis X—X forms the rotational axis of the distributing element 60. Besides the section of FIG. 2 also shows two of the well inlets 34 and 42 respectively through equivalent openings in the wall of the housing 30.

The interior of the housing 30 forms a chamber, the inner contour of which largely corresponds to the outer basic contour of the distributing element 60 which is placed in a rotatable manner within the chamber of the housing 30. The equivalent elements chamber/distributing element can have several alternative mutually rotatable forms, and can for example have a substantially round contour (like a cylindrical cube), as Oil States Industries have constructed their distributing valve, but is preferably hemispherical as is exemplified and illustrated in the Figures.

The internally arranged moveable distributing element 60, is a separating element and is shown in FIG. 2 installed internally in the chamber of housing 30.

Figure 3:
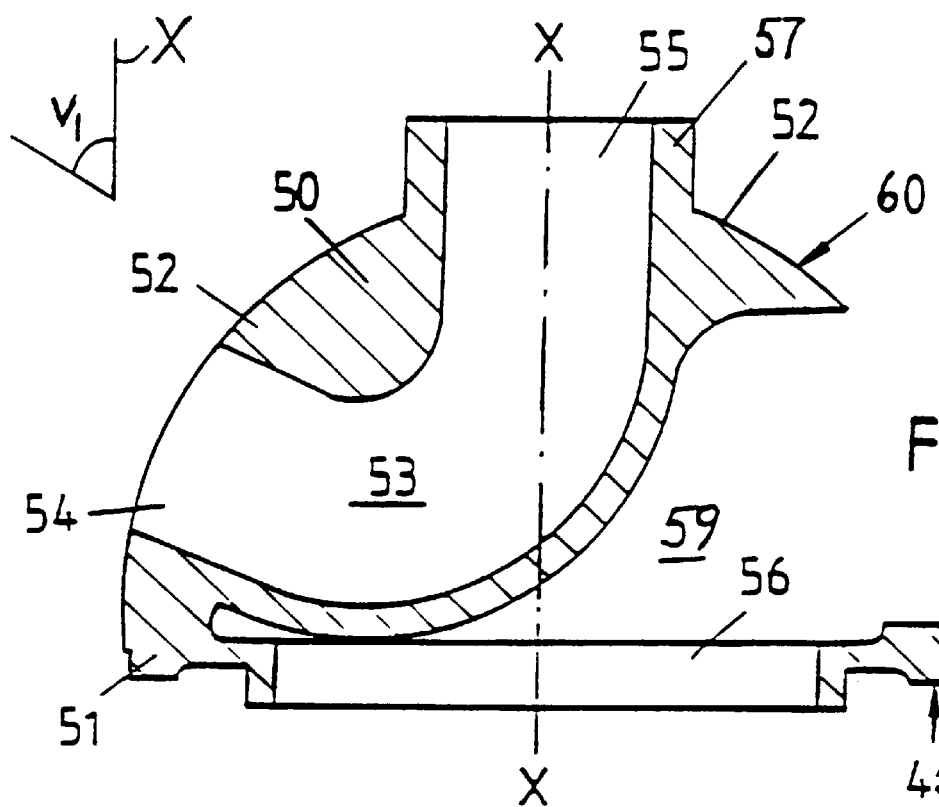
FIG. 3 shows a cross-section of the rotatable distributing element.
Figure 4:
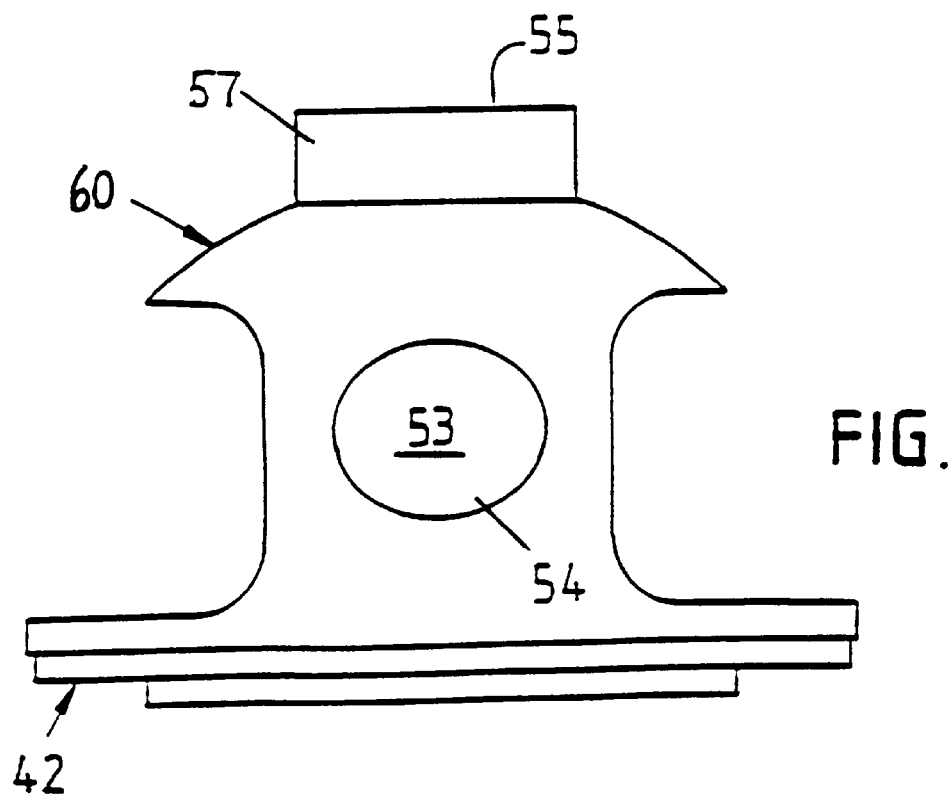
FIG. 4 shows a side view of the rotatable distributing element.

FIGS. 3 and 4 show the distributing element 60 respectively in cross-section and side view. The distributing element 60 (made of a suitable metal) is designed from a hemispherical starting point. The distributing element 60 comprises an annular socket member 45 having a cross-sectional surface largely corresponding to the diametrical surface of the hemisphere. Centrally through the socket member 45 there is designed an opening 56 for the outflow of fluid from the valve. The distributing duct section 53 of the distributing element 60 is arranged to a peripheral edge portion 51 of the annular socket member 45. The distributing duct section 53 constitutes a compact section 50 through which there is formed a curved duct 53, having an inlet 54 and an outlet 55. It will be evident from FIG. 3 that the inlet 54 and the outlet 55 form an angle $v_1$ of about 60° with each other, that is to say this is the angle which the inlet opening 42 forms with the test outlet 46 from the housing 30. The flow of fluid is thus turned or deflected 180°−60°=120°. The inlet opening 54 for the duct is positioned so that, with the distributing element mounted in the housing 30, it will be aligned with the well inlets 34–44 together with the said parking position 33, all according to how the distributing element is turn-positioned. The outlet opening 55 of the duct is positioned concentrically to the top point of the sphere so that the outlet is aligned with the central outlet opening 46 of the housing.

The compact distributing duct section 50 comprises in the upper section an upwardly projecting neck portion 57 having a circular cross-section and outer periphery and adapted to be rotatably installed in the central outlet opening 46 of the housing 30.

The compact distributing duct section 50 constitutes only a portion of the hemispherical form, and has an outer contour 52 as the spherical shape adapted to the inner chamber walls of the housing. As will be seen from FIG. 3, that portion of the compact distributing duct section 50 which faces towards fluid mixing chamber 59 of the distributing element has rounded and smooth shapes, this in order to avoid turbulence in the currents of fluid through the distributing valve.

Preferably the angle $v_1$ between the inlet 54 and the outlet 55 is in the region of about 45–90°, especially preferred within the region 50–70°, and the most preferred about 60° as indicated in the Figure.

The socket member 45 is turnably mounted in the seat 62 in the annular bottom portion 48 of the housing 30. The bottom outlet 24 of the housing is aligned with the bottom outlet 56 of the distributing element and has substantially the same opening area.

The compact duct-forming portion 50 constitutes only a portion of a hemispherical volume in order to influence to the least degree possible the natural through flow of the fluid through mixing chamber 59 of the valve, when the distributing element stands in the parking position. This means that it is desirable that the distributing element is designed so that the chamber 59 becomes the largest possible, at the same time as the distributing valve is able to function satisfactorily.

The two angle relationships between inlet and outlet are also significant parameters in arriving at a satisfactory operation of the distributing valve. As regard the test system this angle relationship is stated above.

As regards the angle relationship between the inlets 34–44 from the wells to the housing 30 and the main outlet flow 80 (FIG. 2) from the housing, 30 these form an angle of $v_2$ with each other. Preferably the angle $v_2$ is in the region of about 90–135°, especially preferred within the region 115–130°, and most preferred about 120° (that is to say the flow is deflected 60 degrees) as is indicated in FIG. 2.

According to the invention it is important that all the inlets 34–44 to the mixing chamber 59 form the same angle $v_2$ with the common outlet 80 from the housing 30. This constitutes a significant difference from the valve solution of Oil States Industries. Furthermore it is an important difference that the two outlet flows are led in diametrically opposite directions, while according to the construction of Oil States Industries they are led in almost the same direction out of the housing. With the present construction, all the fluid currents into the housing 30 get approximately the same flow resistance, while in the solution of Oil States Industries the resistance against the flow will vary strongly, all according to where the inlets are placed on the housing relative to the outlet. Purely as to flow the distributing valve thus represents a big advance relative to the solution which is presented by Oil States Industries. Furthermore the actuator-driven turning device in the construction is incorporated with the test outlet opening 46. Thereby the test outlet opening will not take up unnecessary volume of the mixing chamber.

Tests have shown that when a distributing valve is designed with the mentioned angle relationships $v_1$=60° and $v_2$=120°, this gives optimal flow conditions through the distributing valve, and without problematic turbulences arising in the valve. It will be seen that if the angle $v_2$ increases up towards 135°, so will the angle $v_1$ decline correspondingly. The sum of the angles $v_1+v_2$ is equal to 180°. It is preferred to employ a distributing valve where the inlets and the outlets are designed so that the angle $v_2$ lies as far as possible up towards the straight course, that is to say up towards 135°. This means at $v_2$ becomes quite acute, that is to say 45°, but it is the angle parameter $v_2$ which is the most important in such a flow connection, and which has to be taken into account most when the valve is constructed.

Generally a large angle value (obtuse angle) between inlet/outlet will provide favourable flow conditions, while a small angle (acute angle) provides less favourable flow conditions.

According to an alternative construction 1 the compact duct-forming part 50 forms a portion of a spherical shell in which openings are designed for the installation and fastening of a bent pipe which so forms the duct 53.

The distributing element 60 is turned about the axis X—X which extends through the top point (at 46) of the housing and the mid-point of the diametrical cross-section of the socket member 45. The duct 53 (and the opening 55) will then be flow connected the whole time with the outlet 46 which leads to the test system. On turning the distributing element 60, the opening 54 will form one after the other flow connections between the well conduits 1–6 and the distributing element duct 53. The test opening outlet of the distributing element 60 comprises a swivel connection with the conduit which leads the fluid further to the test system so that the distributing element 60 can rotate 360 degrees within the housing 30.

In order to avoid undesired leakages, the neck portion 57 of the distributing element 60 is turnable and sealingly connected to outlet 46 of the housing by means of packings 70, see FIG. 2. Furthermore sealings/packings 74 are arranged between bottom portion 48 of the housing and socket member 45 of the distributing element 60.

Furthermore internally in the housing 30 there are arranged, in connection with each inlet opening 34–44, sealing means in the form ring packings in order to avoid leakages especially, when the fluid for example from a well is led via inlet 42 to the test system, to prevent fluid from the five other wells being forced into the flow of test fluid. With the valve in the parked position at 33, it is important that the seal functions so that fluid does not leak into the test system. According to an alternative solution such a packing can be arranged in the metal material around the inlet opening 54 to the duct 53.

The turn-positioning of the spherical valve is regulated and controlled by an actuator system, shown at 76, and which will be well known to the specialist.

The valve according to the invention is a multi-port selector valve with a series of inlets and only two outlets, and which will give the user two possibilities of choice.

The one possibility is that all wells (where the inlets can have a cross-sectional flow dimension of 15 cm (6")) are passed through the outlet (dimension 40 cm (16")) while the test outlet (dimension of 20 cm (8")) is closed. The distributing element 60 is then in the parked position 33.

The other possibility is that fluid from 5 of the wells is led to the processing installation through the distributing element 60, while the sixth well flows through the test outlet 46. In this function the distributing element is turn-positioned in alignment with the well inlet which is to be tested.

Thus according to the invention there is produced a novel distributing valve arrangement which will remedy all the disadvantages which are listed by way of introduction in connection with the previously known arrangement.

I claim:

1. A distribution valve comprising
   a housing having a plurality of inlet openings for the introduction of fluid, a first main outlet opening in communication with said inlets for conducting an outflow mixture of fluids, and a second outlet opening opposite said first outlet opening; each said inlet opening individually forming the same angle with said first main outlet opening; and
   a rotatable distributing element rotatably mounted in said housing, said element having a fluid mixing chamber in communication with said inlet openings and a duct having an inlet for selective communication with a respective one of said inlet openings in said housing and an outlet in communication with said second outlet opening in said housing.

2. A distribution valve as set forth in claim 1 wherein said angle between a respective inlet opening and said first main outlet opening is in the range of from 90° to 135°.

3. A distribution valve as set forth in claim 1 wherein said angel is in the range of from 110° to 130°.

4. A distribution valve as set forth in claim 1 wherein said angle is 120°.

5. A distribution valve as set forth in claim 2 wherein each inlet opening forms an angle with said second outlet opening in the range of from 45° to 90°.

6. A distribution valve as set forth in claim 2 wherein each inlet opening forms an angle with said second outlet opening in the range of from 50° to 70°.

7. A distribution valve as set forth in claim 2 wherein each inlet opening forms an angle with said second outlet opening in the range of from 60°.

8. A distribution valve as set forth in claim 7 wherein said angle between a respective inlet opening and said first main opening is 120°.

9. A distribution valve as set forth in claim 1 wherein said housing is of hemispherical shape and said distributing member is part-hemispherical.

10. A distribution valve as set forth in claim 9 wherein said housing has a blend position for said duct inlet and wherein said blind position and said inlet openings are equi-spaced peripherally of said housing.

11. A distribution valve as set forth in claim 1 wherein said outlet openings are disposed on a common axis and said distributing element is rotatable about said common axis.

12. A distribution valve comprising
    a housing of hemispherical shape having a plurality of inlet openings for the introduction of fluid, a first main outlet opening in communication with said inlets for conducting an outflow mixture of fluids, and a second outlet opening opposite said first outlet opening; each said inlet opening individually forming the same angle with said first main outlet opening; and
    a rotatable distributing element rotatably mounted in said housing, said element having a fluid mixing chamber in communication with said inlet openings and said main outlet opening and a duct for selectively communicating a respective one of said inlet openings with said second outlet opening.

13. A distribution valve as set forth in claim 12 wherein said angle between a respective inlet opening and said first main outlet opening is in the range of from 90° to 135°.

14. A distribution valve as set forth in claim 13 wherein each inlet opening forms an angle with said second outlet opening in the range of from 45° to 90°.

15. A distribution valve as set forth in claim 12 wherein said housing has a blind position for said duct inlet and wherein said blind position and said inlet openings are equi-spaced peripherally of said housing.

16. A distribution valve as set forth in claim 12 wherein said outlet openings are disposed on a common axis.

17. A distribution valve for an oil and gas installation comprising
    a housing having a chamber, a plurality of inlet openings for coupling to a respective plurality of well conduits for the introduction of well fluids into said chamber, a first main outlet opening in communication with said chamber for conducting an outflow mixture of the received fluids, and a second outlet opening opposite said first outlet opening for removing a test sample of fluid; each said inlet opening individually forming the same angle with said first main outlet opening; and a rotatable distributing element rotatably mounted in said chamber of said housing, said element having a fluid mixing chamber in communication with said inlet openings and said main outlet opening and a duct for selectively communicating a respective one of said inlet openings with said second outlet opening for removing a test sample of fluid from said respective inlet opening.

18. A distribution valve as set forth in claim 17 wherein said angle between a respective inlet opening and said first main outlet opening is in the range of from 90° to 135°.

19. A distribution valve as set forth in claim 18 wherein each inlet opening forms an angle with said second outlet opening in the range of from 45° to 90°.

20. A distribution valve as set forth in claim 17 wherein said outlet openings are disposed on a common axis.

* * * * *

UNITED STATES PATENT AND TRADEMARK OFFICE
CERTIFICATE OF CORRECTION

PATENT NO. : 6,000,430
DATED : December 14, 1999
INVENTOR(S) : Siegmund Nafz

It is certified that error appears in the above-identified patent and that said Letters Patent is hereby corrected as shown below:

Column 5, line 60 change " inlets" to -inlet openings-
    Line 62, after "first" insert -main- Column 6, line 9 change "angel" to -angle-
    Line 26 change "member" to -element-
    Line 28 change "blend" to -blind-
    Line 37 change "inlets" to -inlet openings-
    Line 39 after "first" insert -main- Signed and Sealed this Eleventh Day of July, 2000

*Attest:*

Q. TODD DICKINSON

*Attesting Officer*     *Director of Patents and Trademarks*